United States Patent
Ito (10) Patent No.: US 10,421,168 B2
(45) Date of Patent: Sep. 24, 2019

(54) MACHINE TOOL

(71) Applicant: STAR MICRONICS CO., LTD., Shizuoka-shi (JP)

(72) Inventor: Shin Ito, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 0 days.

(21) Appl. No.: 15/961,998

(22) Filed: Apr. 25, 2018

(65) Prior Publication Data

US 2018/0236622 A1 Aug. 23, 2018

Related U.S. Application Data

(63) Continuation of application No. PCT/JP2016/075333, filed on Aug. 30, 2016.

(30) Foreign Application Priority Data

Feb. 1, 2016 (JP) .................................. 2016-016819

(51) Int. Cl.
*B23Q 11/08* (2006.01)
*B23B 7/06* (2006.01)
(Continued)

(52) U.S. Cl.
CPC ............ *B23Q 11/0883* (2013.01); *B23B 7/06* (2013.01); *B23B 13/12* (2013.01); *B23B 13/126* (2013.01);
(Continued)

(58) Field of Classification Search
CPC ................ B23Q 11/08; B23Q 11/0883; B23Q 11/0808; B23Q 7/10; B23B 13/126; B23B 25/04; B23B 2231/28; B23B 2260/058
See application file for complete search history.

(56) References Cited

U.S. PATENT DOCUMENTS

| 4,195,538 A | 4/1980 | Brown |
| 4,201,935 A | 5/1980 | Fukuma et al. |

(Continued)

FOREIGN PATENT DOCUMENTS

| FR | 2338108 | 8/1977 |
| GB | 2021013 | 11/1979 |

(Continued)

OTHER PUBLICATIONS

EPO, Extended European search report of EP 16889335.2 dated May 22, 2019.

*Primary Examiner* — Willmon Fridie, Jr.
(74) *Attorney, Agent, or Firm* — Lex IP Meister, PLLC (57) ABSTRACT

The machine tool comprises a headstock provided with a main spindle; a driving unit which moves the headstock in a main spindle axial direction and has a feed mechanism extended in the main spindle axial direction and a front end supporter which rotatably supports a front end of the feed mechanism; a first front cover mounted on the headstock in a first position between the main spindle and the feed mechanism with respect to a diameter direction from a main spindle axis toward the feed mechanism; and a second front cover mounted on the front end supporter in a second position between the main spindle and the feed mechanism. Part of the feed mechanism is covered by both of the first front cover and the second front cover when at least part of the first front cover is on the rear side of the second front cover.

5 Claims, 11 Drawing Sheets

(51) Int. Cl.
*B23B 13/12* (2006.01)
*B23B 25/04* (2006.01)
*B23Q 5/40* (2006.01)

(52) U.S. Cl.
CPC ............... *B23B 25/04* (2013.01); *B23Q 5/40* (2013.01); *B23Q 11/0825* (2013.01)

(56) References Cited

U.S. PATENT DOCUMENTS

| | | | |
|---|---|---|---|
| 6,120,222 A * | 9/2000 | Hiramoto | B23Q 11/0042 409/134 |
| 6,189,424 B1 * | 2/2001 | Wheeling | B23B 13/02 82/1.11 |
| 6,551,038 B1 * | 4/2003 | Sugata | B23Q 11/08 29/DIG. 56 |
| 2002/0009343 A1 * | 1/2002 | Uetake | B23Q 11/08 409/134 |
| 2008/0258410 A1 | 10/2008 | Yamane et al. | |
| 2009/0018001 A1 * | 1/2009 | Jakob | B23Q 5/58 483/2 |
| 2019/0001453 A1 * | 1/2019 | Ishikawa | B23Q 11/0883 |
| 2019/0105746 A1 * | 4/2019 | Nakazawa | B23Q 1/70 |

FOREIGN PATENT DOCUMENTS

| | | |
|---|---|---|
| JP | 09-225703 | 9/1997 |
| JP | 2004-130437 | 4/2004 |
| JP | 2008-264925 | 11/2008 |

* cited by examiner

MACHINE TOOL

CROSS-REFERENCE TO RELATED APPLICATION

The present application is a continuation of PCT Application No. PCT/JP2016/075333, filed on Aug. 30, 2016, which claims priority of Japanese Patent Application No. 2016-016819 filed on Feb. 1, 2016. The contents of this application are incorporated herein by reference in their entirety.

BACKGROUND

(a) Field

The present invention relates to a machine tool provided with a headstock movable in the axial direction of a main spindle.

(b) Description of the Related Art

In a conventional sliding headstock type lathe, a workpiece is slidably supported by a guide bush provided on the front side of a main spindle. A headstock comprising the main spindle is movalble in the axial direction of the main spindle by a driving unit including a ball screw (feed mechanism) extended in the axial direction, a nut mounted on the headstock to be engaged with the ball screw, and a servo motor for rotatably driving the ball screw. The headstock is provided with a ball screw cover for safety and protection, for example, from workpiece dust.

In a sliding headstock type lathe disclosed in Japanese Patent Application Publication No.H9-225703, a guide bush holder is detachably mounted on a supporting bed. When the guide bush is not needed, the guide bush holder is replaced by a cover having a protective hole into which the leading end of the main spindle is to be inserted. The replacement cover is not a protection cover for the ball screw.

SUMMARY

In the conventional sliding headstock type lathe without the use of the guide bush, the headstock is necessarily arranged closer to the front side with respect to the axial direction of the main spindle according to the position of the replacement cover than in the lathe with the use of the guide bush. The headstock is desirably provided with a protection cover for the front side of the ball screw in the lathe with the use of the guide bush. The front cover is necessarily long enough to entirely protect the ball screw with respect to the axial direction of the main spindle even when the headstock is in the most retracted position. The supporting bed for the guide bush is necessarily positioned without interference with the front cover even when the headstock is in the most advanced position. The main spindle is desirably positioned nearer the guide bush and therefore necessarily long enough according to the length of the front cover. As a result, the machine necessarily have enough dimensions to satisfy such requirements.

Such problem is not limited to a lathe provided with a ball screw, but to a machine tool provided with a driving unit having a feed mechanism such as a linear motor stator.

The present invention provides a machine tool capable of reducing the machine size.

A machine tool comprises a headstock provided with a main spindle for gripping a workpiece; a driving unit which moves the headstock in a main spindle axial direction, the driving unit being provided with a feed mechanism extended in the main spindle axial direction and a front end supporter which rotatably supports a front end of the feed mechanism; a first front cover mounted on the headstock in a first position between the main spindle and the feed mechanism with respect to a diameter direction from the main spindle axis toward the feed mechanism; and a second front cover mounted on the front end supporter in a second position between the main spindle and the feed mechanism with respect to the diameter direction; wherein part of the feed mechanism is covered by both of the first front cover and the second front cover when at least part of the first front cover is on the rear side of the second front cover.

The first aspect of the present invention provides a machine tool capable of reducing the machine size. The second and third aspects of the invention provides a machine tool capable of further reducing the machine size.

DETAILED DESCRIPTION

An embodiment of the present invention is being described. The embodiment is only an example of the invention. The features included in the embodiment are not necessarily essential to a solution of the invention.

(1) Summary of Technology Included in the Invention

A summary of technology included in the invention is being described referring to the drawings schematically showing a sliding headstock type lathe 1 as an example of a machine tool. The schematic drawings may have a mismatch to each other due to different magnifications in each direction.

A machine tool 1 of the invention as illustrated in FIG. 1 to FIG. 8 includes a headstock 10 provided with a main spindle 12 for gripping a workpiece W1, a driving unit 20, a first front cover 50, and a second front cover 60. The driving unit 20 moves the headstock 10 in a main spindle axial direction D1. The driving unit 20 is provided with a feed mechanism 22 extended in the main spindle axial direction D1 and a front end supporter 25 adapted to rotatably support a front end 23a of the feed mechanism 22. The first front cover 50 is mounted on the headstock 10 in a first position between the main spindle 12 and the feed mechanism 22 with respect to a diameter direction D2 from a main spindle axis AX1 toward the feed mechanism 22. The second front cover 60 is mounted on the front end supporter 25 in a second position between the main spindle 12 and the feed mechanism 22 with respect to the diameter direction D2. Part of the feed mechanism 22 is covered by both of the first front cover 50 and the second front cover 60 when at least part of the first front cover 50 is on the rear (S2) side of the second front cover 60.

Figure 9:
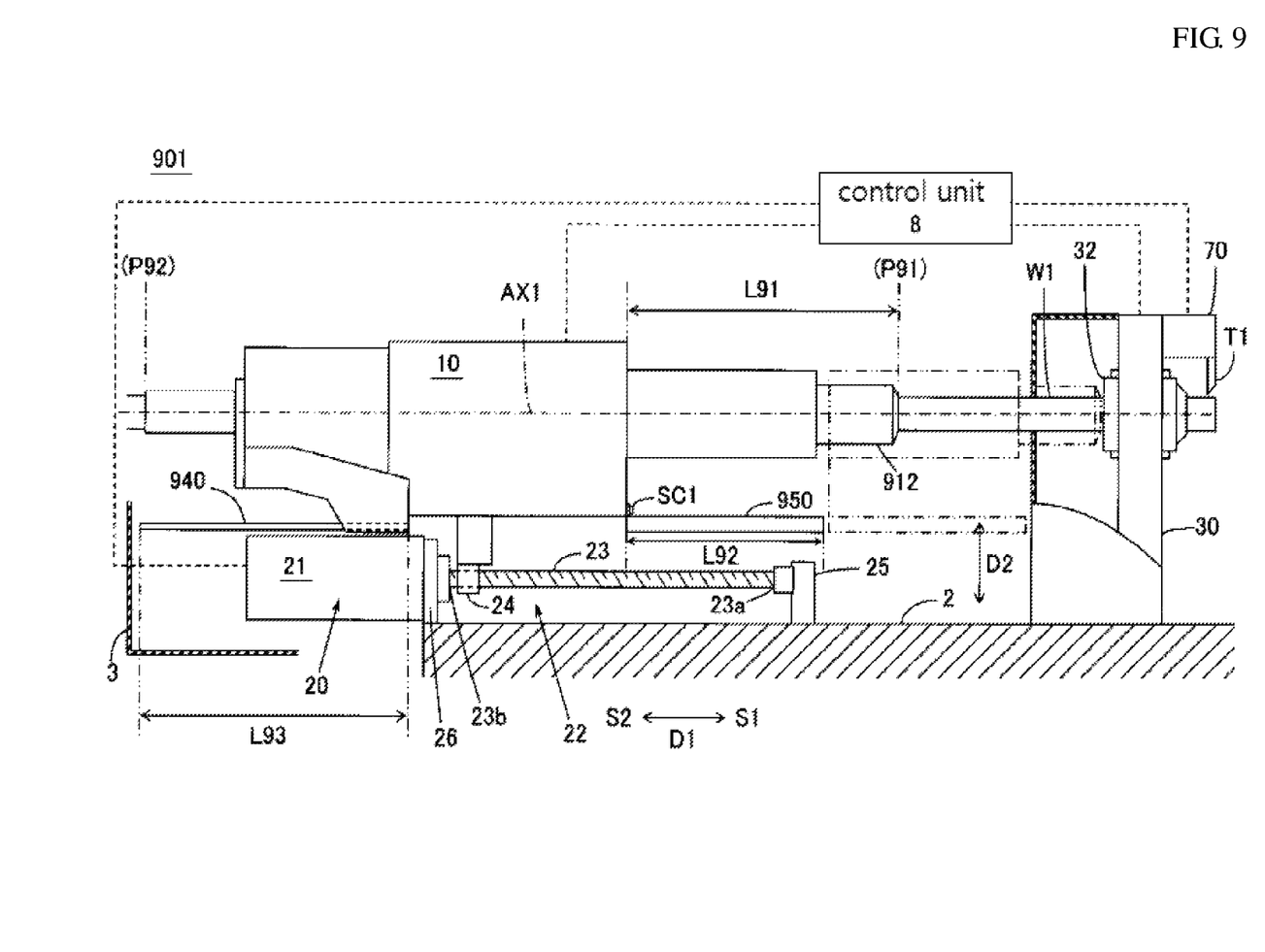
FIG. 9 is a schematic partial sectional view of part of the lathe with the use of the guide bush in a comparative example when the main spindle is in the most retracted position.
Figure 10:
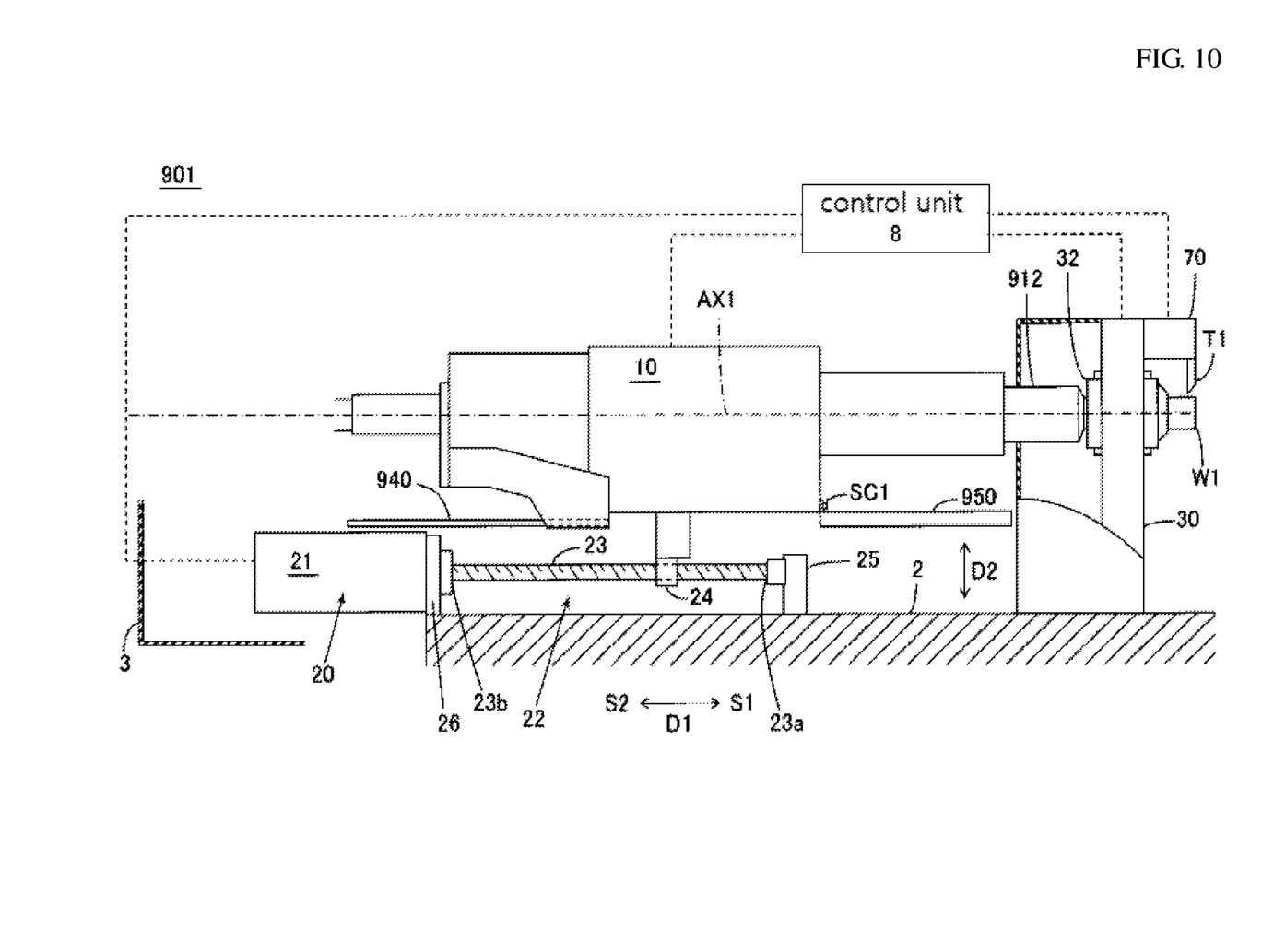
FIG. 10 is a schematic partial sectional view of part of the lathe with the use of the guide bush in the comparative example when the main spindle is in the most advanced position.
Figure 11:
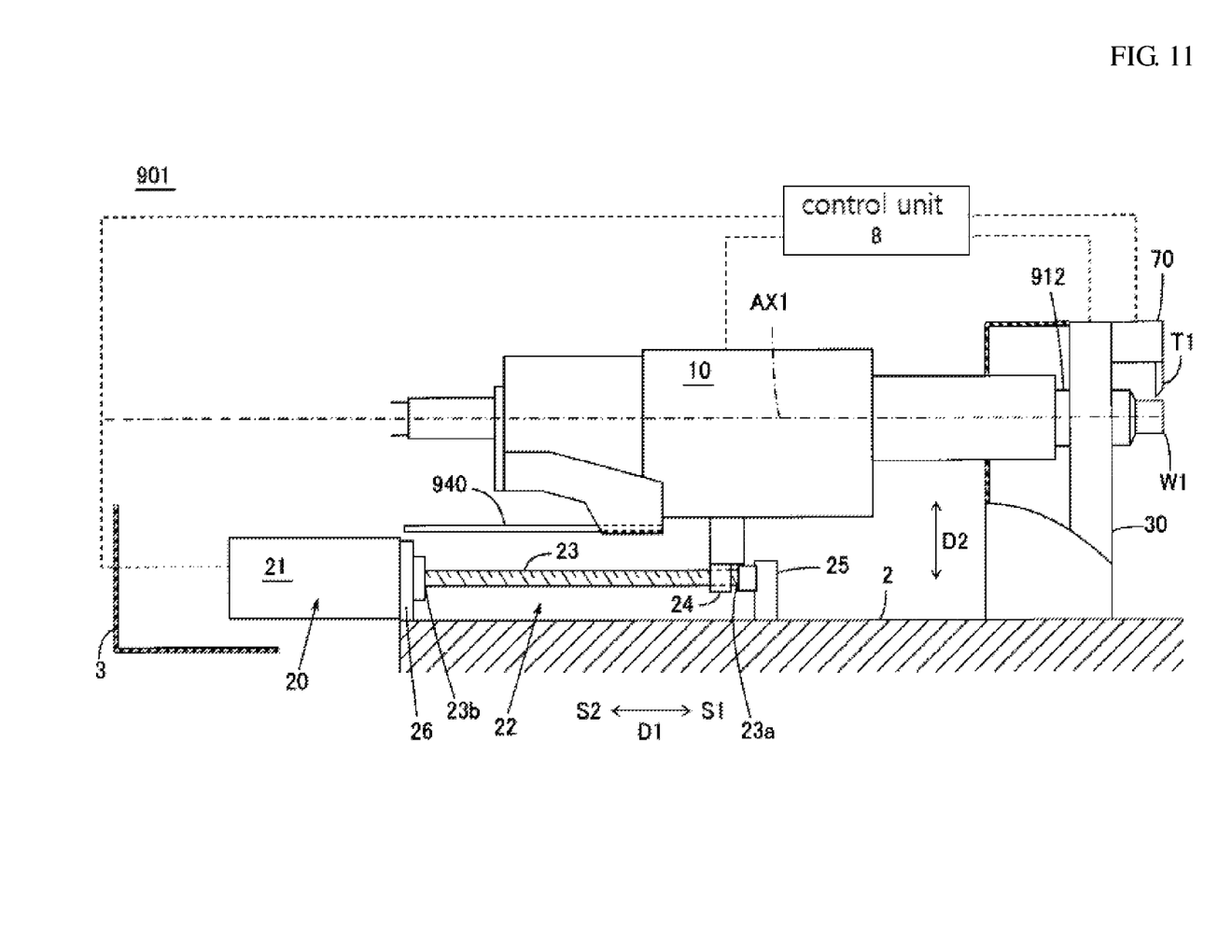
FIG. 11 is a schematic partial sectional view of part of the lathe without the use of the guide bush in the comparative example when the main spindle is in the most advanced position.

FIG. 9 to FIG. 11 is a schematic partial sectional drawing of a sliding headstock type lathe 901 in a comparative example. Any element similar to the embodiment is denoted by a corresponding symbol. In the lathe with the use of a guide bush, a main spindle 912 is in a position of a two-dot chain when the headstock 10 is in the most advanced position. FIG. 9 shows a housing 3, a front end position P91 of the main spindle 912, and a rear end position P92 of the main spindle 912. The main spindle 912 has a protruding length L91 with respect to the main spindle axial direction D1 corresponding to the distance between the front end of the headstock 10 and the front end position P91 of the main spindle 912.

The headstock 10 is provided with a front cover 950 for protecting the front (S1) side of a ball screw 23 and a rear cover 940 for protecting the rear (S2) side thereof as shown in FIG. 9 and FIG. 10. The front cover 950 is extended in the main spindle axial direction D1 whose cover length L92 being long enough to cover from the middle of the ball screw 23 to the front end 23a thereof even when the headstock 10 is in the most retracted position as shown in FIG. 9. A supporting bed 30 for a guide bush 32 is provided without interference with the front cover 950 even when the headstock 10 is in the most advanced position as shown in FIG. 10. The protruding length L91 of the main spindle 912 with respect to the main spindle axial direction D1 is determined according to the length of the front cover 950 to avoid interference with the supporting bed 30. When the guide bush 32 is removed from the supporting bed 30 as shown in FIG. 11, the main spindle 912 is in the further advanced position. The front cover 950 is detached from the headstock 10 to prevent interference with the supporting bed 30.

Figure 1:
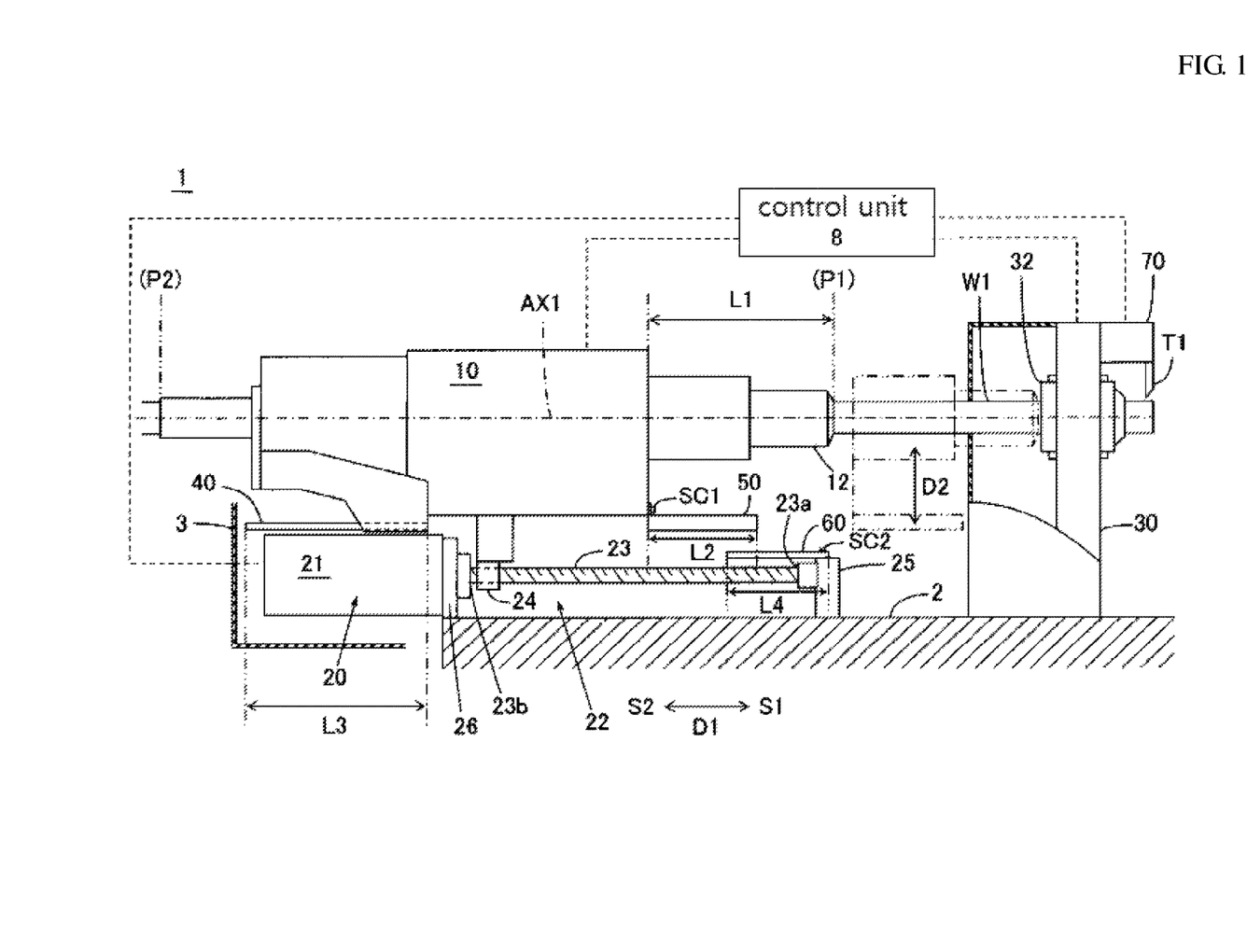
FIG. 1 is a schematic partial sectional view of part of the lathe with the use of the guide bush when the main spindle is in the most retracted position.
Figure 2:
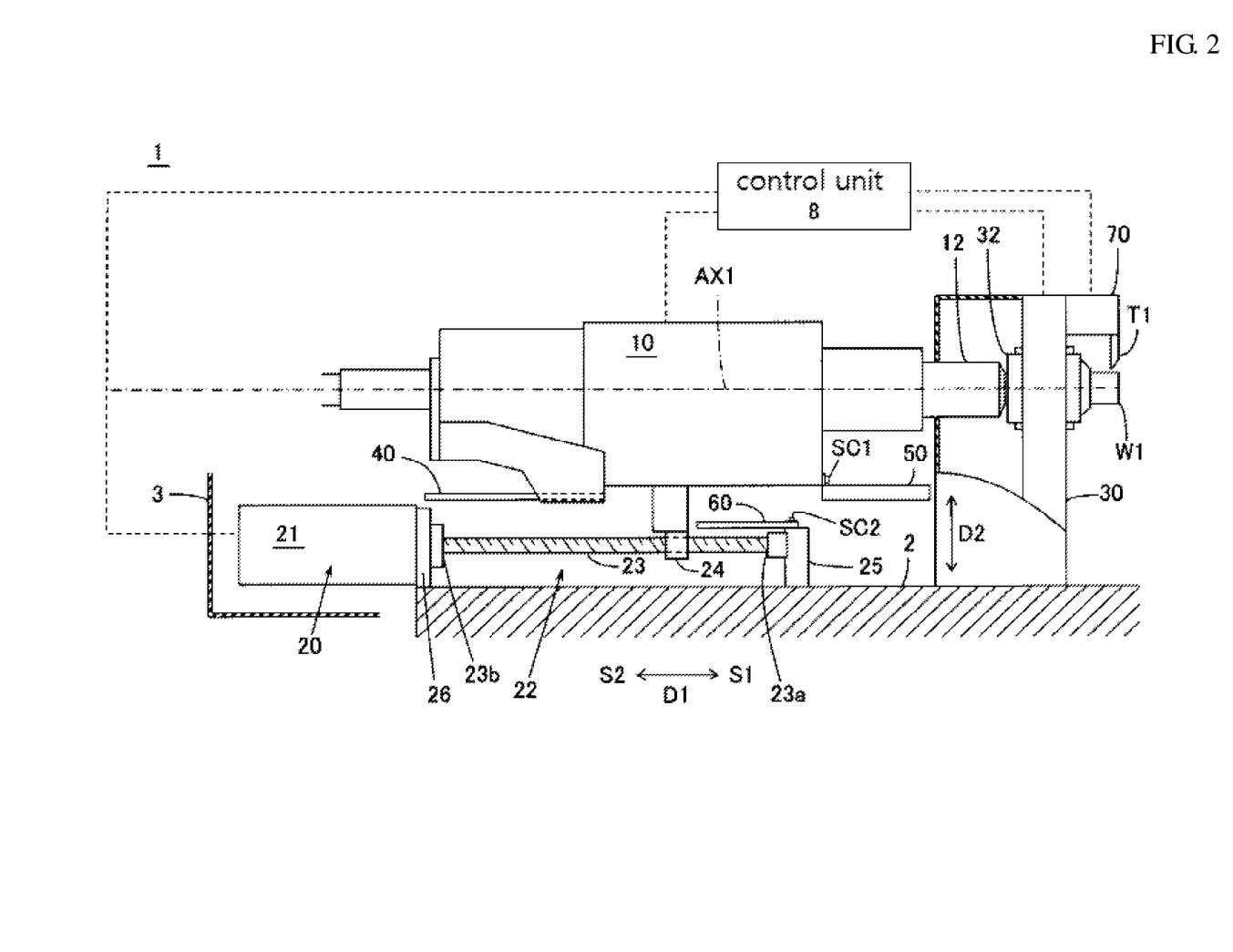
FIG. 2 is a schematic partial sectional view of part of the lathe with the use of the guide bush when the main spindle is in the most advanced position.

In the invention, the first front cover 50 is mounted on the headstock 10 movable in the main spindle axial direction D1 while the second front cover 60 is mounted on the front end supporter 25 of the feed mechanism 22 as shown in FIG. 1 and FIG. 2. Both of the first front cover 50 and the second front cover 60 therefore functions as the front cover 950 to protect the feed mechanism 22.

The second front cover 60 is provided in a different position from the first front cover 50 between the main spindle 12 and the feed mechanism 22 with respect to the diameter direction D2. There occurs no interference between the first front cover 50 and the second front cover 60 even when the first front cover 50 mounted on the headstock 10 is moved in the main spindle axial direction D1 as shown in FIG. 1 and FIG. 2. When the headstock 10 is retracted, part of the feed mechanism 22 is protected by both of the first front cover 50 on the rear (S2) side and the second front cover 60 on the front (S1) side. Since part of the feed mechanism 22 is protected by the second front cover 60 mounted on the front end supporter 25, the first front cover 50 requires a shorter cover length L2 than the cover length L92 in the comparative example in FIG. 9. The front cover mounted on the headstock 10 is reduced in size with respect to the main spindle axial direction D1, preventing interference with a mechanical element such as the supporting bed 30 for the guide bush 32. The main spindle 12 requires a shorter protruding length L1 than the protruding length L91 of the main spindle 912, thereby reducing the size of the main spindle 12 with respect to the main spindle axial direction D1. Accordingly, the invention provides a machine tool capable of reducing the machine size.

The cover may be removably mounted on a cover holder such as the headstock and the front end supporter. The cover may be mounted on a fitting attached to the cover holder. The cover may be integrally formed with the cover holder.

Any description relating to the position with respect to the diameter direction only represents an appearance viewed from the main spindle axial direction regardless of an exact position with respect to the main spindle axial direction.

When at least part of the first front cover 50 is on the rear (S2) side of the second front cover 60, a continuous arrangement with respect to the main spindle axial direction D1 would improve protection effect. Any description relating to the position with respect to the main spindle axial direction only represents an appearance viewed from the diameter direction regardless of an exact position with respect to the diameter direction.

When at least part of the first front cover 50 is on the rear (S2) side of the second front cover 60, a partially overlapped arrangement with respect to the main spindle axial direction D1 would further improve protection effect. The partially overlapped arrangement means that part of the second front cover overlaps the first front cover in the diameter direction though their positions with respect to the main spindle axis direction are not completely the same.

The second front cover is desirably positioned between the first front cover and the feed mechanism with respect to the diameter direction, but may be positioned between the main spindle and the first front cover with respect to the diameter direction. For example, in FIG. 4, a supporting structure for the first front cover 50 may be provided extending downwards from the front side of the headstock 10 to the first front cover 50 via a bypass route in an X-axis direction (for example, leftwards in FIG. 4). Another supporting structure for the second front cover 60 may be provided extending upwards from the front end supporter 25 to the second front cover 60 via a bypass route in the other X-axis direction (for example, rightwards in FIG. 4). The second front cover 60 may be thereby positioned between the main spindle 12 and the first front cover 50 in the diameter direction D2.

Figure 3:
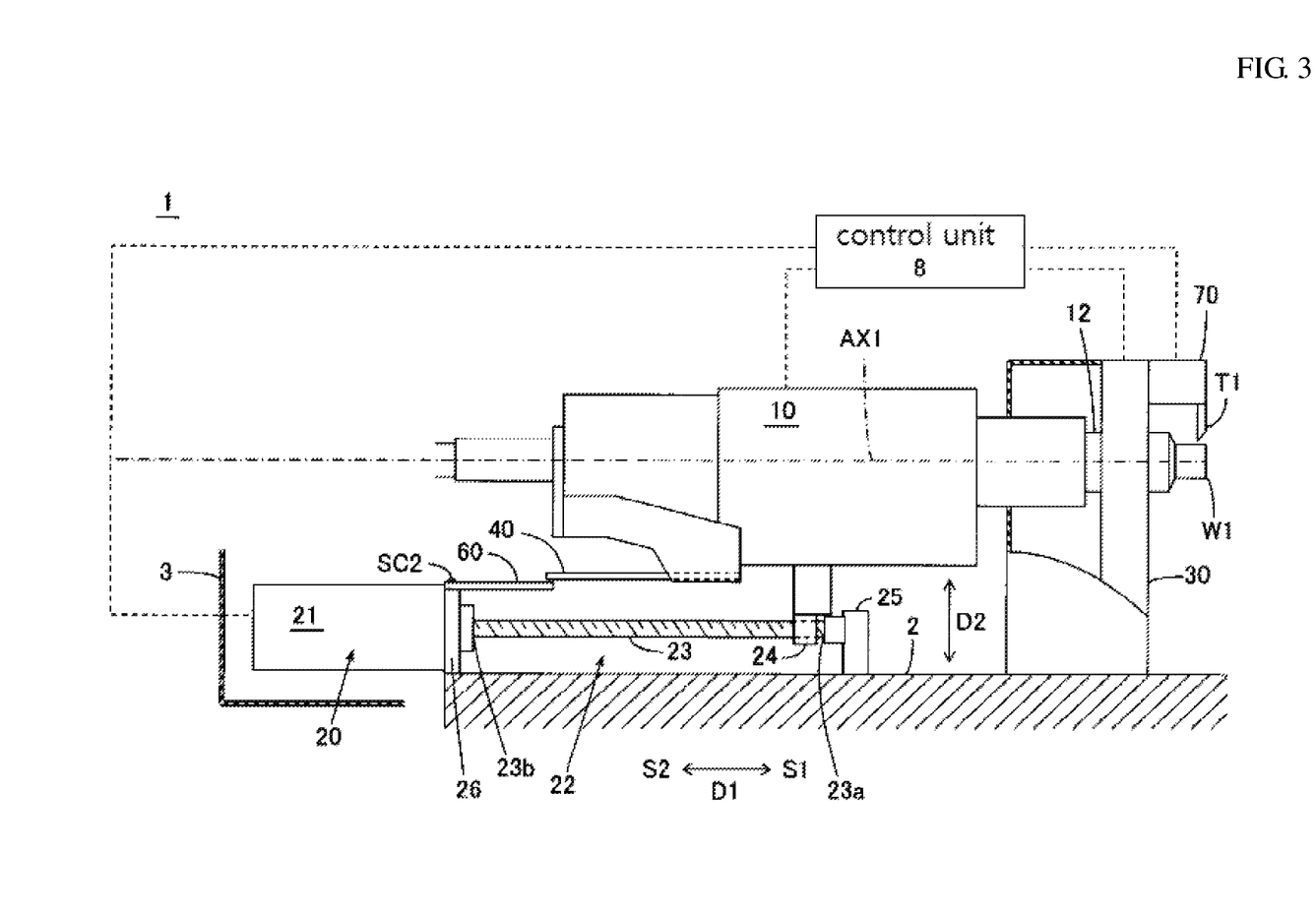
FIG. 3 is the schematic partial sectional view of part of the lathe without the use of a guide bush when the main spindle is in the most advanced position.

The machine tool 1 may be further provided with the supporting bed 30 on which the guide bush 32 is removably mounted. The guide bush 32 is adapted to slidably support the workpiece W1 on the front (S1) side of the main spindle 12. At least one of the first front cover 50 and the second front cover 60 may be removably provided. As shown in FIG. 3 and others, at least one of the removed first front cover 50 and the removed second front cover 60 may be used as a common cover to be attached to such a position as covering part of the feed mechanism 22 including a rear end 23b of the ball screw 23. The invention eliminates the need of at least part of a specialized cover for protecting part of the feed mechanism 22 including the rear end 23b. The invention provides a machine tool capable of further reducing the machine size.

The machine tool 1 may be further provided with a rear cover 40 mounted on the headstock 10 to cover part of the feed mechanism 22 on the rear (S2) side of the first front cover 50 mounted on the headstock 10. The driving unit 20 may be provided with a rear end supporter 26 adapted to rotatably support the rear end 23b of the feed mechanism 22. The removed common cover (for example, the second front cover 60 in FIG. 3) may be removably attached to the rear end supporter 26 in a different position from the rear cover 40 between the main spindle 12 and the feed mechanism 22 with respect to the diameter direction D2. Part of the feed mechanism 22 is protected by both of the rear cover 40 on the front (S1) side and the common cover 60 on the rear (S2) side.

As shown in FIG. 3, the common cover 60 attached to the rear end supporter 26 is provided in a different position from the rear cover 40 between the main spindle 12 and the feed mechanism 22 with respect to the diameter direction D2. There occurs no interference between the rear cover 40 and the common cover 60 even when the rear cover 40 mounted on the headstock 10 is moved in the main spindle axial direction D1 Part of the feed mechanism 22 is protected by both of the rear cover 40 on the front (S1) side and the common cover 60 on the rear (S2) side.

The comparative example in FIG. 9 to FIG. 11 shows that a rear cover 940 is extended in the main spindle axial direction D1 whose cover length L93 being long enough to cover from the middle of the ball screw 23 to the rear end 23b even when the headstock 10 is in the most advanced position in the lathe without the use of the guide bush. The housing 3 on the rear (S2) side is provided without interference with the rear cover 940 even when the headstock 10 is in the most retracted position in the lathe with the use of the guide bush as shown in FIG. 9.

Part of the feed mechanism 22 is protected by the common cover 60 mounted on the rear end supporter 26. The rear cover 40 therefore requires a shorter cover length L3 than the cover length L93 in the comparative example. The rear cover mounted on the headstock 10 can be reduced in size with respect to the main spindle axial direction D1, preventing interference with a mechanical element such as the housing 3. Accordingly, the invention provides a machine tool capable of further reducing the machine size.

The rear end supporter may be any element rotatably supporting the rear end of the feed mechanism including a motor applying torque to the rear end of the feed mechanism. The front end supporter may be any element rotatably supporting the front end of the feed mechanism including a motor applying torque to the front end of the feed mechanism.

When the rear cover 40 is on the front (S1) side of the common cover (the second front cover 60 in FIG. 3), a continuous arrangement with respect to the main spindle axial direction D1 would improve protection effect.

When the rear cover 40 is on the front (S1) side of the common cover (the second front cover 60 in FIG. 3), a partially overlapped arrangement with respect to the main spindle axial direction D1 would further improve protection effect. The partially overlapped arrangement means that part of the common cover overlaps the rear cover in the diameter direction though their positions with respect to the main spindle axial direction are not completely the same.

Figure 5:
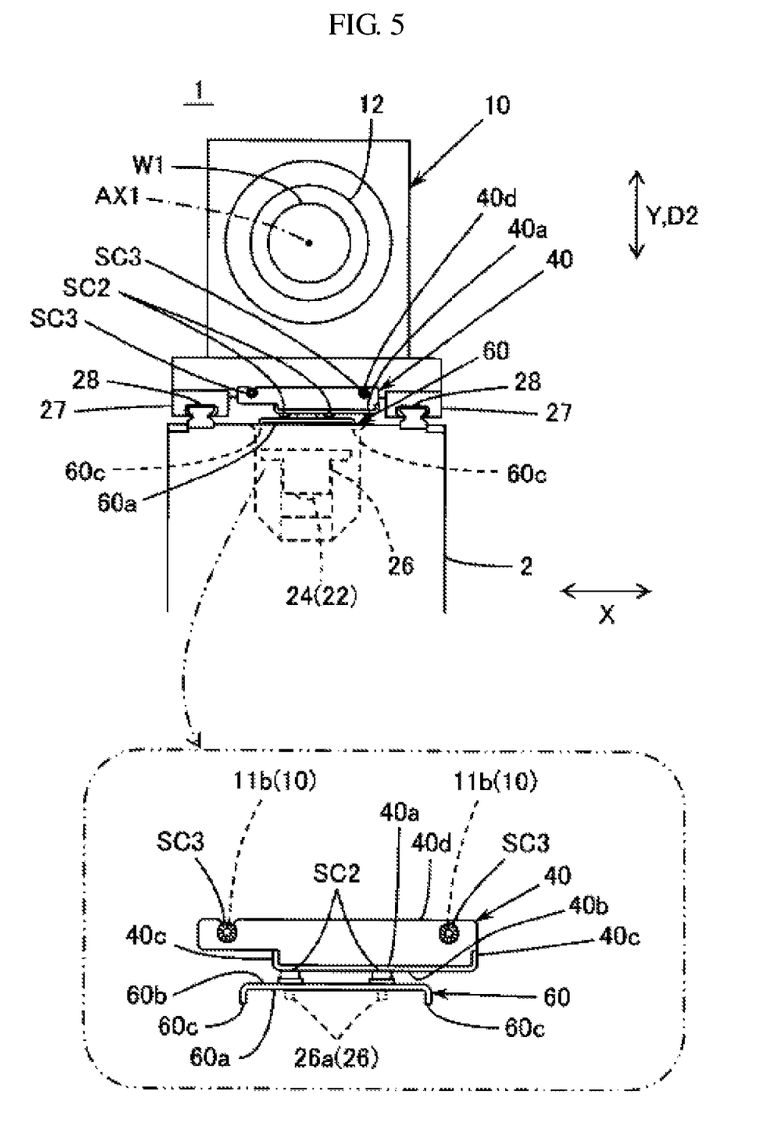
FIG. 5 is a schematic view of part of the lathe without the use of the guide bush as seen from the rear side with respect to the main spindle axial direction.

The common cover is desirably positioned between the rear cover and the feed mechanism with respect to the diameter direction, but may be positioned between the main spindle and the rear cover by providing the rear cover and the common cover each with the X-axis direction bypass structure in FIG. 5.

The common cover (the second front cover 60 in FIG. 3) may be provided with a common engagement structure (for example, a through-hole 61a in FIG. 6C) to be engaged with the cover holder on the front (S1) side (for example, the front end supporter 25 in FIG. 1) and the cover holder on the rear (S2) side (for example, the rear end supporter 26 in FIG. 3). Such configuration eliminates the need of providing the common cover 60 (the second front cover 60 in FIG. 3) with a separate engagement structure when used as a common cover to protect part of the feed mechanism 22 including the rear end 23b thereof. The common cover can be simplified in structure.

The cover holder on the front (S1) side includes the front end supporter of the feed mechanism and the headstock. The cover holder on the rear (S2) side includes the rear end supporter of the feed mechanism and the rear cover.

(2) Embodiment of the Invention

FIG. 1 is a schematic partial sectional view of part of the sliding headstock type lathe (machine tool) 1 with the use of the guide bush when the headstock 10 is in the most retracted position. The main spindle 12 is in a position of two-dot chain when the headstock 10 is in the most advanced position. FIG. 1 shows the housing 3, a front end position P1 of the main spindle 12, and a rear end position P2 of the main spindle 12. The main spindle 12 has a protruding length L1 with respect to the main spindle axial direction D1 corresponding to the distance between the front end of the headstock 10 and the front end position P1 of the main spindle 12.

Figure 4:
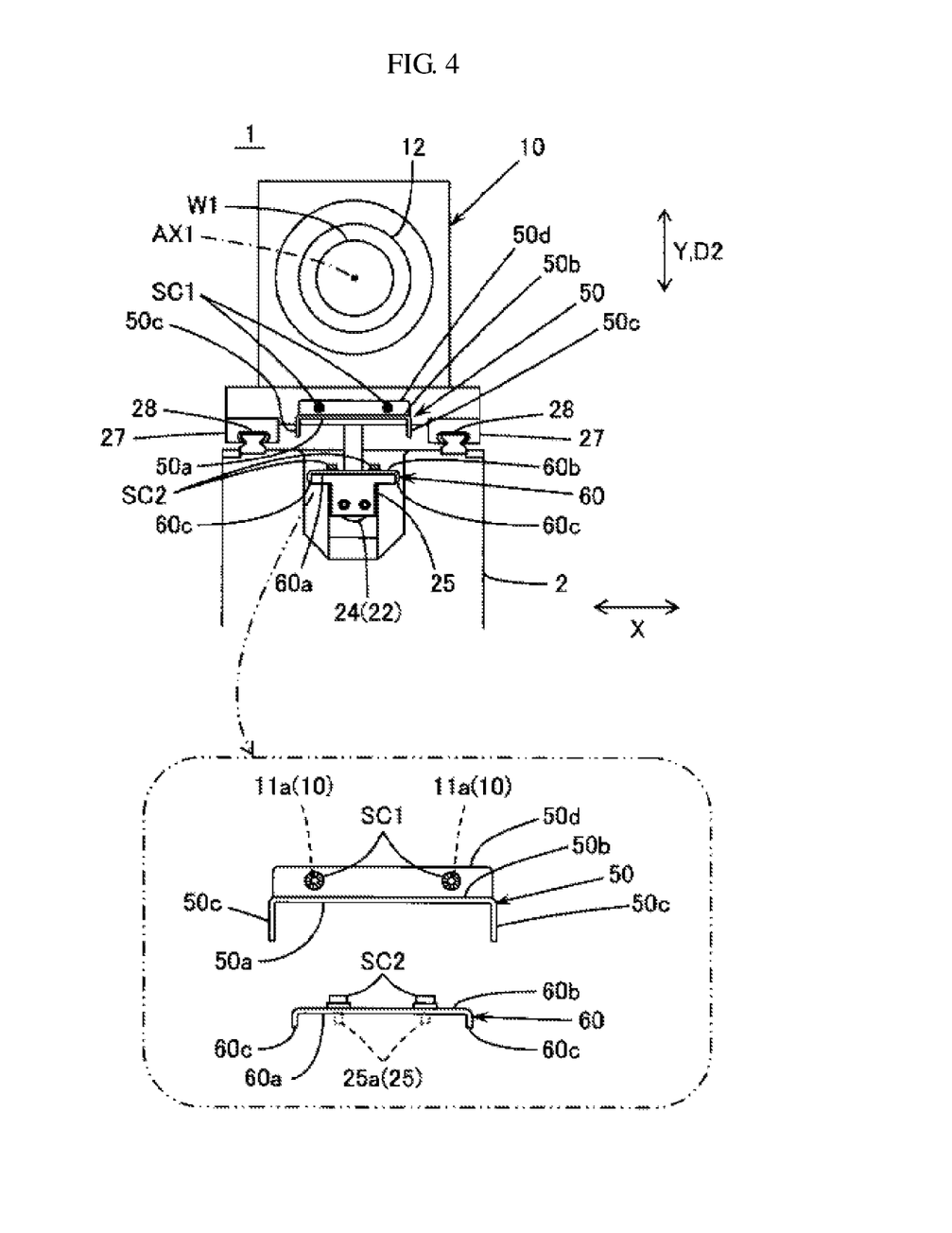
FIG. 4 is a schematic view of part of the lathe with the use of the guide bush as seen from the front side with respect to the main spindle axial direction.

FIG. 2 is a schematic partial sectional view of part of the lathe 1 with the use of the guide bush when the headstock 10 is in the most advanced position. FIG. 3 is a schematic partial sectional view of part of the lathe 1 without the use of the guide bush when the headstock 10 is in the most advanced position. FIG. 4 is a schematic partial sectional view of part of the lathe 1 with the use of the guide bush as seen from the front (S1) side with respect to the main spindle axial direction D. FIG. 4 includes an enlarged view of the first front cover 50 and the second front cover 60. FIG. 5 is a schematic partial sectional view of part of the lathe 1 without the use of the guide bush as seen from the rear (S2) side with respect to the main spindle axial direction D1. FIG. 5 includes an enlarged view of the second front cover 60 (an example of the common cover) and the rear cover 40. For convenience of explanation, the first front cover 50, the second front cover 60, and the rear cover 40 are named based on positional relationship in the lathe 1 with the use of the guide bush. At least one of the first front cover 50 and the second front cover 60 may be on the rear (S2) side of the rear cover 40 in the lathe 1 without the use of the guide bush.

The lathe 1 as shown in FIG. 1 to FIG. 5 includes a bed 2, a control unit 8, the headstock 10, the driving unit 20, the supporting bed 30, the covers 40, 50, and 60, and a tool post 70. The bed 2 is also referred to as a table, constituting a supporting base for the headstock 10, the driving unit 20, and the supporting bed 30. The control unit 8 controls operation of the headstock 10, the driving unit 20, the supporting bed 30, and the tool post 70. The main spindle 12 provided on the headstock 10 releasably grips the cylindrical (bar-shaped) workpiece W1 inserted in the main spindle axial direction D1. The workpiece W1 is rotated on the main spindle axis AX1 along the longitudinal direction of the workpiece W1. The headstock 10 comprising the main spindle 12 is movable in the main spindle axial direction D1.

The driving unit 20 includes an NC-controlled servo motor 21 and the feed mechanism 22 extended in the main spindle axial direction D1 to move the headstock 10 in the main spindle axial direction D1. The driving unit 20 is further provided with the front end supporter 25 and the rear end supporter 26. The feed mechanism 22 includes the ball screw 23 extended in the main spindle axial direction D1 and a nut 24 engaged with the ball screw 23. The ball screw 23 is rotatably driven by the servo motor 21 around a rotational axis extended along the main spindle axis AX1. The nut 24 is fixed to the headstock 10 to be movable in the main spindle axial direction D1 according to the rotation of the ball screw 23. The front end 23a of the ball screw 23 (the feed mechanism 22) is rotatably supported by the front end supporter 25. The rear end 23b of the ball screw 23 (the feed mechanism 22) is rotatably supported by the rear end supporter 26. The rear end supporter 26 as shown in FIGS. 1 to 3 also functions as a cover for the motor 21. As shown in FIGS. 4 and 5, a pair of rails 28 are mounted on the bed 2 with its longitudinal direction oriented in the main spindle axial direction D1. A pair of guides 27 are mounted on the headstock 10 with its longitudinal direction oriented in the main spindle axial direction D1. Each of the guides 27 slides on each of the rails 28. The guide and rail combinations are provided across the ball screw 23 in the horizontal X-axis direction perpendicular to the main spindle axial direction D1. The guides 27 and the rails 28 may be exchangeable with each other.

The guide bush 32 mounted on the supporting bed 30 is arranged on the front side of the main spindle 12 to support the longer workpiece W1 inserted through the main spindle 12 in a slidable manner in the main spindle axial direction D1. The guide bush 32 is rotationally driven around the main spindle axis AX1 in synchronization with the main spindle 12. The guide bush 32 is mounted on the supporting bed 30 in a detachable manner to prevent deflection of the workpiece, thereby improving machining accuracy. As shown in FIGS. 1 and 2, when the guide bush 32 is mounted on the supporting bed 30, the headstock 10 comprising the main spindle 12 is moved in the main spindle axial direction D1 within a range on the rear (S2) side of the guide bush 32. A portion of the workpiece W1 between the main spindle 12 and the guide bush 32 is outside the machining range, undesirably producing a longer uncut portion of the workpiece W1. Further, the operated workpiece W1 held by the guide bush 32 is not allowed to be retracted and then advanced again for another operation. The guide bush 32 is therefore removed from the supporting bed 30 as shown in FIG. 3 as the case may be. When the guide bush 32 is removed, the headstock 10 comprising the main spindle 12 is moved in the main spindle axial direction D1 within a range closer to the front (S1) side than when the guide bush 32 is mounted, thereby shortening the distance from the main spindle 12 to the tool post 70. The guide bush may be rotatable as in the embodiment. The guide bush may be stationary instead.

Figure 6A:
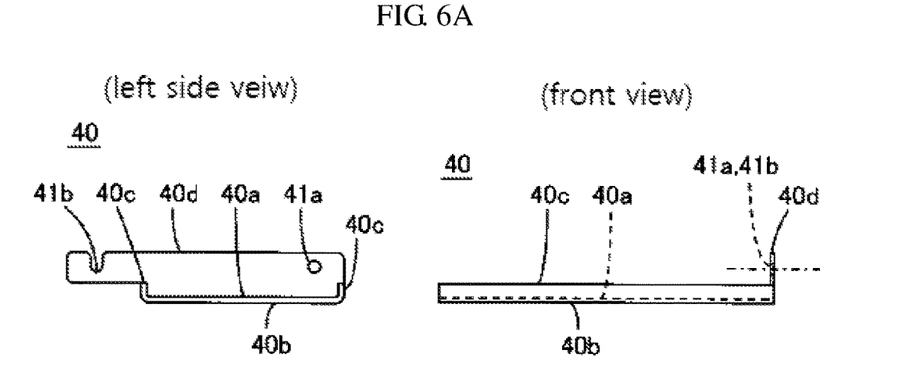
FIG. 6A is a left side view and a front view of a rear cover.

The rear cover 40 is fixed to the headstock 10 to protect part of the ball screw 23 on the rear (S2) side behind the nut 24 with respect to the main spindle axial direction D1. The rear cover 40 covers part of the feed mechanism 22 on the rear (S2) side of the first front cover 50 mounted on the headstock 10. FIG. 6A shows a front view and a left side view of the rear cover 40. As shown in FIGS. 1 to 3 and FIG. 5, the rear cover 40 comprises a substantially-flat base 40b, a pair of short sides 40c extended upwards from the side edges of the base 40b in the X-axis direction, and a bent 40d extended upwards from the front (S1) side edge of the base 40b. A groove 40a opening upwards is thereby formed with the longitudinal direction oriented in the main spindle axial direction D1. The bent 40d is provided with a through-hole 41a and a recess 41b to receive screws SC3. Such screw receiver is not limited to two, but may be one or three and more.

As shown in FIG. 5, the headstock 10 is provided on the rear-end face thereof with a pair of screw-holes 11b to be engaged with the screws SC3. The screw SC3 through the through-hole 41a is engaged with one of the screw-holes 11b and the screw SC3 through the recess 41b is engaged with the other of the screw-holes 11b. The rear cover 40 is thereby mounted on the headstock 10.

The first front cover 50 is detachably mounted on the headstock 10 in the lathe with the use of the guide bush as shown in FIGS. 1 and 2. The first front cover 50 is provided in a first position between the main spindle 12 and the ball screw 23 with respect to the diameter direction D2 from the main spindle axis AX1 toward the feed mechanism 22. The first front cover 50 may be removed from the headstock 10 when the guide bush is not needed. The diameter direction D2 corresponds to a Y-axis direction in FIGS. 4 and 5. When the main spindle 12 is advanced as shown in FIG. 2, the first front cover 50 is advanced to a position beyond the extension range of the ball screw 23. The first front cover 50 is still positioned between the main spindle 12 and the ball screw 23 as seen from the main spindle axial direction D1.

Figure 6B:
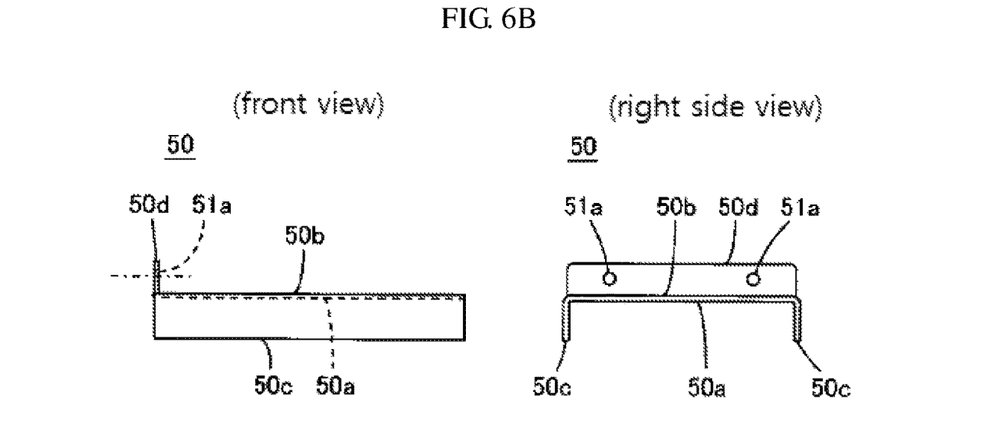
FIG. 6B is a front view and a right side view of a first front cover.

FIG. 6B shows a front view and a left side view of the first front cover 50. As shown in FIGS. 1, 2, and 4, the first front cover 50 comprises a substantially-flat base 50b, a pair of sides 50c respectively extended downwards from the side edges of the base 50b in the X-axis direction, and a bent 50d extended upwards from the rear (S2) side edge of the base 50b. A groove 50a opening downwards is thereby formed with the longitudinal direction oriented in the main spindle axial direction D1. The bent 50d is provided with a pair of through-holes 51a to receive screws SC1. Such screw receiver is not limited to two, but may be one or three and more.

As shown in FIG. 4, the headstock 10 is provided on the front-end face thereof with a pair of screw-holes 11a to be engaged with the screws SC1. The screws SC1 through the through-holes 51a are engaged with the screw-holes 11a. The first front cover 50 is thereby mounted on the headstock 10.

The second front cover 60 is detachably mounted on the front end supporter 25 of the ball screw 23 in the lathe with the use of the guide bush as shown in FIGS. 1 and 2. The second front cover 60 is provided in a second position between the first front cover 50 and the ball screw 23 with respect to the diameter direction D2 from the main spindle axis AX1 toward the feed mechanism 22. The second front cover 60 may be reversed with respect to the front to rear directions to be detachably mounted on the rear end supporter 26 to function as the common cover in the lathe without the use of the guide bush. When the main spindle 12 is advanced as shown in FIG. 2, the second front cover 60 is retracted to a position beyond the extension range of the first front cover 50. The second front cover 60 is still positioned between the first front cover 50 and the ball screw 23 as seen from the main spindle axial direction D1.

Figure 6C:
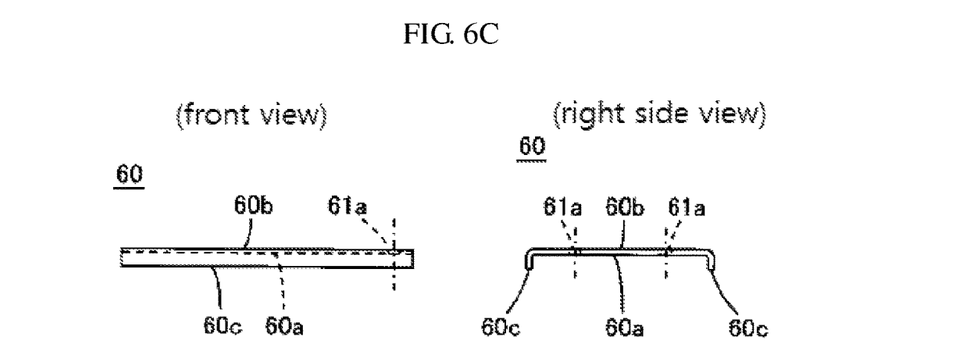
FIG. 6C is a front view of and a right side view of a second front cover.

FIG. 6C shows a front view and a right side view of the second front cover 60. As shown in FIGS. 1, 2, and 4, the second front cover 60 comprises a substantially-flat base 60b, a pair of short sides 60c respectively extended downwards from the side edges of the base 60b in the X-axis direction. A groove 60a opening downwards is thereby formed with the longitudinal direction oriented in the main spindle axial direction D1. The base 60b is provided with a pair of through-holes 61a to receive screws SC2. Such screw receiver is not limited to two, but may be one or three and more. The through-holes 61a are provided near the front end of the base 60b in the lathe with the use of the guide bush as shown in FIGS. 1 and 2. The through-holes 61a are provided near the rear end of the base 60b in the lathe without the use of the guide bush as shown in FIG. 3.

As shown in FIG. 4, the front end supporter 25 is provided on the top face thereof with a pair of screw-holes 25a to be engaged with the screws SC2. The screws SC2 through the through-holes 61a are engaged with the screw-holes 25a. The second front cover 60 is thereby mounted on the front end supporter 25. As shown in FIG. 5, the rear end supporter 26 is provided on the top face thereof with a pair of screw-holes 26a to be engaged with the screws SC2. The screws SC2 through the through-holes 61a are engaged with the screw-holes 26a. The second front cover 60 is thereby mounted on the rear end supporter 26.

The cover length L2 of the first front cover 50 with respect to the main spindle axial direction D1 is set to the amount allowing the front end of the first front cover 50 to be on the rear (S2) side of the front end 23a of the ball screw 23 when the headstock 10 is in the most retracted position in the lathe with the use of the guide bush as shown in FIG. 1. The cover length L2 is also set to the amount allowing the front end of the first front cover 50 to be slightly on the front (S1) side of the rear end of the second front cover 60 when the headstock 10 is in the most retracted position. The cover length L2 is further set to the amount preventing the first front cover 50 from interfering with the supporting bed 30 when the headstock 10 is in the most advanced position as shown in FIG. 2.

The cover length L3 of the rear cover 40 with respect to the main spindle axial direction D1 is set to the amount covering the rear end 23b of the ball screw 23 even when the headstock 10 is in the most advanced position in the lathe with the use of the guide bush as shown in FIG. 2. The cover length L3 is also set to the amount allowing the rear end of the rear cover 40 to be on the front (S1) side of the rear end 23b of the ball screw 23 and to be slightly on the rear (S2) side of the front end of the second front cover 60 mounted on the rear end supporter 26 when the headstock 10 is in the most advanced position in the lathe without the use of the guide bush as shown in FIG. 3.

The cover length L4 of the second front cover 60 with respect to the main spindle axial direction D1 is set to the amount allowing the rear end of the second front cover 60 to be on the front (S1) side of the rear end of the first front cover 50 and slightly on the rear (S2) side of the front end of the first front cover 50 when the headstock 10 is in the most retracted position in the lathe with the use of the guide bush as shown in FIG. 1. The cover length L4 is also set to the amount allowing the front end of the second front cover 60 to be slightly on the front (S1) side of the rear end of the rear cover 40 when the headstock 10 is in the most advanced position in the lathe without the use of the guide bush as shown in FIG. 3.

The tool post 70 is mounted on the supporting bed 30. A plurality of tools T1 are attached to the tool post 70 in a movable manner in the X-axis direction and the Y-axis direction perpendicular to both of the main spindle axial direction D1 and the X-axis direction. The tool T1 includes a stationary tool such as a turning tool and a rotary tool such as a drill.

Further, a back working attachment provided with a back working spindle (sub spindle) may be provided on the bed 2 to releasably grip the front-operated workpiece W1 inserted in the main spindle axial direction D1. The elements 2 and 10 to 70 may be made of metal.

In the embodiment, both of the first front cover 50 on the headstock and the second front cover 60 on the front end supporter 25 functions as a front cover to protect the front (S1) side of the ball screw 23. The protruding length L1 of the main spindle 12 is thereby shortened. The machine size with respect to the main spindle axial direction D1 is thereby shortened. Further, the second front cover 60 is changed in position depending on the use of the guide bush. The cover length L3 of the rear cover with respect to the main spindle axial direction D1 is thereby shortened. The machine size with respect to the main spindle axial direction D1 is thereby shortened. The lathe with or without the use of the guide bush is being described.

When the guide bush is needed, the guide bush 32 is attached to the supporting bed 30 as shown in FIG. 1. The first front cover 50 is attached to the front surface of the headstock 10 with the screws SC1. The second front cover 60 is attached to the upper surface of the front end supporter 25 with the screws SC2. A range of the ball screw 23 from the front end 23a thereof toward the rear (S2) side is protected by the second front cover 60. When the front surface of the headstock 10 is on the rear (S2) side of the rear end of the second front cover 60, a range of the ball screw 23 from the front end 23a thereof to the front surface of the headstock 10 is protected by both of the first front cover 50 and the second front cover 60

When the guide bush is not needed, the guide bush 32 is detached from the supporting bed 30 as shown in FIG. 3. The first front cover 50 is detached from the front surface of the headstock 10 by removing the screws SC1. The second front cover 60 is detached from the upper surface of the front end supporter 25 by removing the screws SC2. The detached second front cover 60 is reversed with respect to the rear to front directions and then attached to the upper surface of rear end supporter 26 with the screws SC2. The second front cover 60 attached to the rear end supporter 26 expands the protection range for the ball screw 23 toward the rear (S2) side. A range of the ball screw 23 from the rear end 23b thereof toward the front (S1) side is protected by the second front cover 60 functioning as the common cover. Part of the ball screw 23 on the front (S1) side of the front end of the second front cover 60 is protected by the rear cover 40.

As described above, the removed second front cover 60 can be attached to the rear end supporter 26, eliminating the need of keeping the removed second front cover 56 outside the machine.

(3) Advantageous Effect of the Embodiment

As described, the first front cover 50 is mounted on the headstock 10 movable in the main spindle axial direction D1 while the second front cover 60 is mounted on the front end supporter 25 not movable in the main spindle axial direction D1 in the lathe with the use of the guide bush. They both function as the front cover to protect part of the ball screw 23. The second front cover 60 is in a position between the first front cover 50 and the ball screw 23 with respect to the diameter direction D2. The first front cover 50 on the headstock 10 is movable in the main spindle axial direction D1 without interference with the second front cover 60 as shown in FIGS. 1 and 2. When the headstock 10 is retracted, part of the first front cover 50 on the rear (S2) side overlaps part of the second front cover 60 on the front (S1) side to protect part of the feed mechanism 22. The first front cover 50 and the second front cover 60 have the same protective function as the front cover 950 of the comparative example in FIGS. 9 and 10. The overlap occurs between the rear end of the second front cover 60 and the front end of the first front cover 50 in the main spindle axial direction D1.

Such protective configuration of the second front cover 60 requires the first front cover 50 to have the shorter cover length L2 than the cover length L92 of the front cover 950 in the comparative example. The difference in cover length requires the main spindle 12 to have the shorter protruding length L1 than the protruding length L91 of the main spindle 912 without interference of the first front cover 50 with the supporting bed 30. The embodiment provides the shorter main spindle 12 and thereby the smaller machine tool.

When the guide bush is not needed, the second front cover 60 detached from the front end supporter 25 is reversed with respect to the rear to front directions and then attached to the rear end supporter 26 not-movable in the main spindle axial direction D1. The second front cover 60 functioning as the common cover protects part of the ball screw 23 including the rear end 23b thereof. The second front cover 60 is in a position between the rear cover 40 and the ball screw 23 with respect to the diameter direction D2. The rear cover 40 on the headstock 10 is movable in the main spindle axial direction D1 without interference with the second front cover 60 as shown in FIG. 3. When the headstock 10 is advanced, part of the rear cover 40 on the front (S1) side overlaps part of the second front cover 60 on the rear (S2) side to protect part of the feed mechanism 22. Such protective configuration of the second front cover 60 requires the rear cover 40 to have the shorter cover length L3 than the cover length L93 of the rear cover 940. The difference in cover length avoids interference of the rear cover 40 with the housing 3, thereby reducing the machine size.

Further, the through-hole 61a (an example of the engagement structure) of the second front cover 60 for the front end supporter 25 (an example of the cover holder) may be shared by the rear end supporter 26 (another example of the cover holder). Such common engagement structure eliminates the need of providing the second front cover 60 with another through-hole for the rear end supporter 26. The second front cover 60 is thereby simplified in structure. The common though-hole allows the use of a common screw. Such common configuration would also allow the use of a front cover provided with a non-removable screw with a washer inserted into the through-hole.

(4) Modified Embodiment of the Invention

For example, the feed mechanism protected by the cover may not be limited to the ball screw engaged with the nut but another mechanism such as a linear motor stator and a rack gear engaged with a pinion gear.

Either of the first front cover, the second front cover, and the rear cover may be of another type such as an accordion fold so as to be changeable in length with respect to the main spindle axial direction D1.

The invention may be applied to another machine tool except the lathe.

When part of the first front cover 50 is on the rear (S2) side of the second front cover 60, part of the second front cover may or may not overlap part of the first front cover to protect part of the ball screw 23. The second front cover 60 and the first front cover 50 may be arranged continuously with or without a gap.

Part of the rear cover 40 on the front (S1) side may or may not overlap part of the common cover on the rear (S2) side to protect part of the ball screw 23. The rear cover 40 and the common cover may be arranged continuously with or without a gap.

Figure 7A:
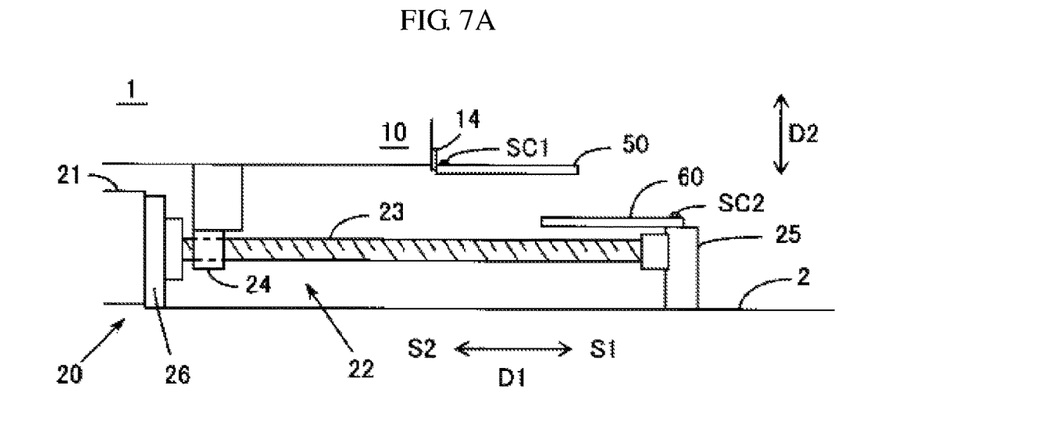
FIG. 7A is a schematic partial sectional view of part of the lathe with the use of the guide bush in a modified embodiment when the main spindle is in the most retracted position.
Figure 7B:
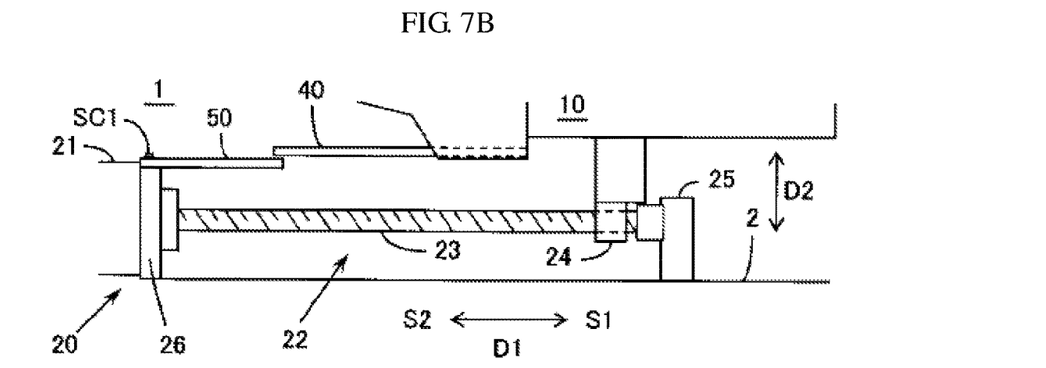
FIG. 7B and FIG. 7C each is a schematic partial sectional view of part of the lathe without the use of the guide bush in the modified embodiment when the main spindle is in the most advanced position.

As shown in FIG. 7A and FIG. 7B, the first front cover 50 may be detachably attached to the rear end supporter 26 as the common cover instead of the second front cover 60. FIG. 7A is a schematic partial sectional view of part of the lathe 1 with the use of the guide bush 32 in the modified embodiment when the main spindle 12 is in the most retracted position. FIG. 7B is a schematic partial sectional view of part of the lathe 1 without the use of the guide bush 32 in the modified embodiment when the main spindle 12 is in the most advanced position. The same symbol is being used for the same element for which the explanation is being omitted.

In FIG. 7A, the headstock 10 is provided with an L-shaped metal fitting 14 for receiving the first front cover 50 on the front surface thereof. The metal fitting 14 has a screw hole for the screw SC1 on the horizontal surface thereof. The metal fitting 14 may be integrally formed with the headstock 10. When the guide bush 32 is not needed, the second front cover 60 is detached from the front end supporter 25 by removing the screw SC2, the first front cover 50 is detached from the metal fitting 14 by removing the screw SC1 and then attached to the upper surface of the rear end supporter 26 with the screw SC1 as the common cover, eliminating the need of keeping the removed first front cover 50 outside the machine. As shown in FIG. 7B, the first front cover 50 is mounted between the rear cover 40 and the ball screw 23 in the diameter direction D2. The rear cover 40 mounted on the headstock 10 is movable in the main spindle axial direction D1 without interference with the first front cover 50. When the headstock 10 is advanced, part of the feed mechanism 22 is protected by the rear cover 40 on the front (S1) side and the first front cover 50 on the rear (S2) side.

Figure 7C:
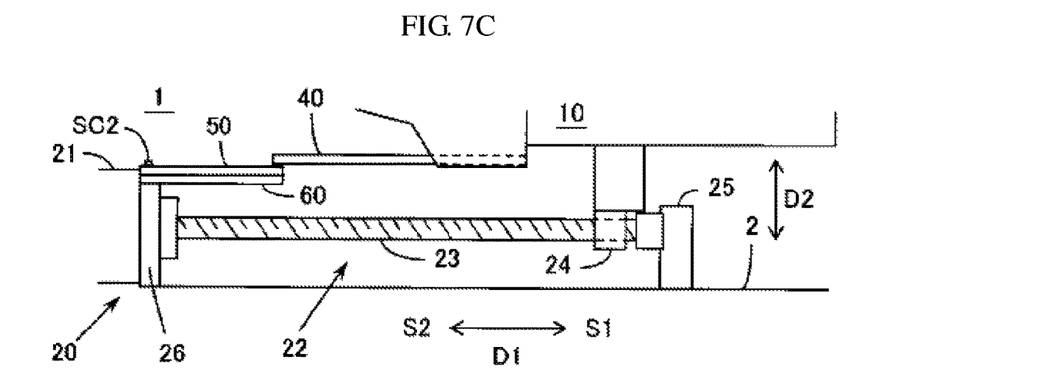

As shown in FIG. 7C, both of the first front cover 50 and the second front cover 60 may be detachably attached to the rear end supporter 26 in the lathe without the use of the guide bush. FIG. 7C shows that a layer of the first front cover 50 on the second front cover 60 is attached to the rear end supporter 26. This configuration eliminates the need of keeping the removed covers outside the machine. The layer may consist of the upper second front cover 60 on the lower first front cover 50.

Figure 8A:
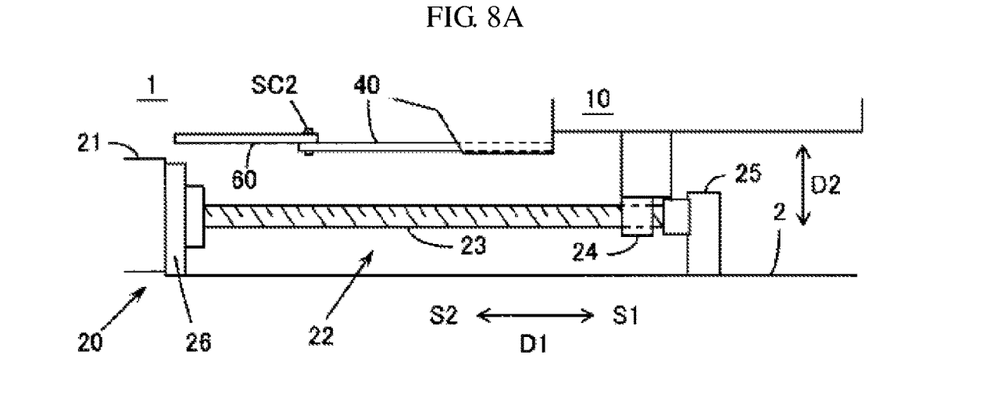
FIG. 8A, FIG. 8B and FIG. 8C each is a schematic partial sectional view of part of the lathe without the use of the guide bush in the modified embodiment when the main spindle is in the most advanced position.
Figure 8B:
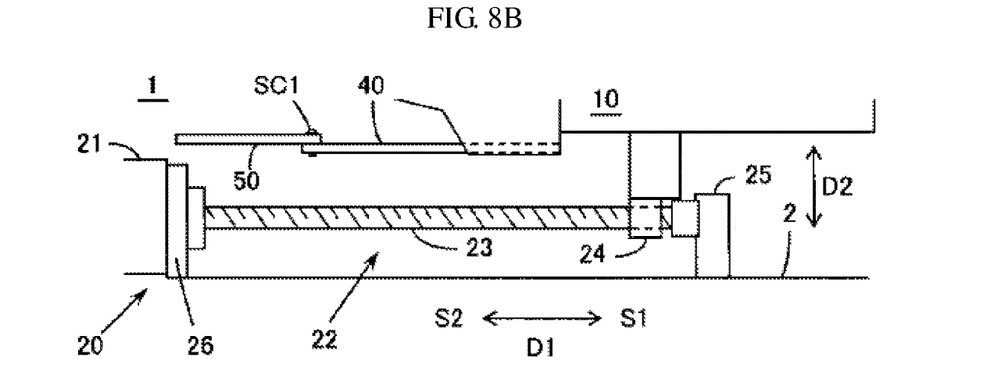
Figure 8C:
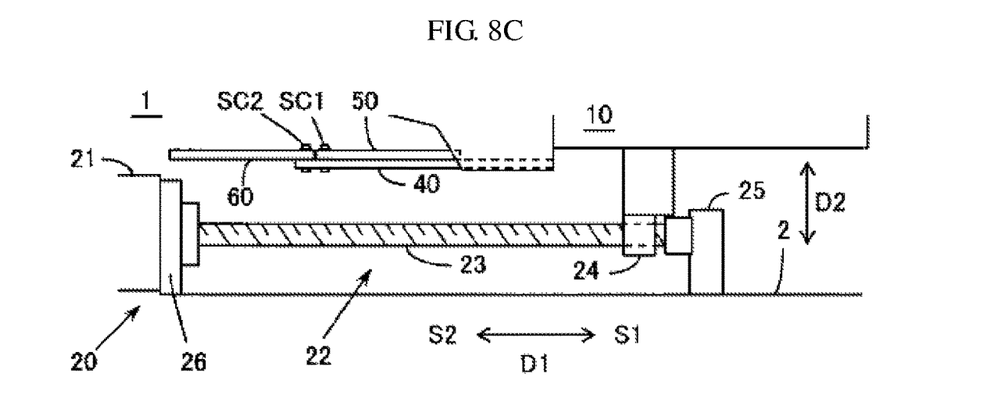

As shown in FIG. 8A, 8B, and 8C, the common cover may be detachably attached to the rear cover 40 instead of the rear end supporter 26.

The rear cover 40 in FIG. 8A is provided with a screw-hole for the screw SC2. When the guide bush 32 is not needed, the second front cover 60 is detached from the front end supporter 25 by removing the screw SC2, and then attached to the rear cover 40 with the screw SC2 as the common cover. The second front cover 60 mounted on the rear cover 40 expands the protection range toward the rear (S2) side covering the rear end 23b of the ball screw 23. When the workpiece W1 gripped by the main spindle 12 is machined, the headstock 10 is moved in the main spindle axial direction D1 within the protection range of the common cover.

The rear cover 40 in FIG. 8B is provided with a screw-hole for the screw SC1. When the guide bush 32 is not needed, the first front cover 50 is detached from the metal fitting 14 by removing the screw SC1, reversed with respect to the rear to front directions and then attached to the rear cover 40 with the screw SC1 as the common cover. The second front cover 60 mounted on the rear cover 40 expands the protection range toward the rear (S2) side covering the rear end 23b of the ball screw 23.

At least one of the first front cover 50 and the second front cover 60 may be laid on the rear cover 40 in the lathe without the use of the guide bush. The rear cover 40 in FIG. 8C is provided with a screw-hole for the screw SC1 and another screw-hole for the screw SC2. When the guide bush 32 is not needed, the first front cover 50 is detached from the metal fitting 14 by removing the screw SC1, and laid on the rear cover 40 with the screw SC1. Further, the second front cover 60 is detached from the front end supporter 25 by removing the screw SC2, and then attached to the rear cover 40 with the screw SC2 as the common cover. This configuration eliminates the need of keeping the removed covers outside the machine. The second front cover 60 may be laid on the rear cover 40 while the first front cover 50 may be attached as the common cover.

The modified embodiment also eliminates the need of at least part of a specialized cover for protecting part of the feed mechanism 22 including the rear end 23b thereof, thus providing a machine tool capable of further reducing the machine size.

The invention provides a machine tool capable of reducing the machine size in various embodiments. The basic functions and effects are available even if the technology includes only the elements in the independent claim (including the embodiment) and not the elements in the dependent claims. The invention includes any replacement or exchange of the configurations disclosed in the embodiments and the modifications. The invention also includes any replacement or exchange of the prior arts and the configurations disclosed in the embodiments and the modifications.

What is claimed is:

1. A machine tool comprising:
    a headstock provided with a main spindle for gripping a workpiece;
    a driving unit which moves the headstock in a main spindle axial direction, the driving unit being provided with a feed mechanism extended in the main spindle axial direction and a front end supporter which rotatably supports a front end of the feed mechanism;
    a first front cover mounted on the headstock in a first position between the main spindle and the feed mechanism with respect to a diameter direction from a main spindle axis toward the feed mechanism; and
    a second front cover mounted on the front end supporter in a second position between the main spindle and the feed mechanism with respect to the diameter direction;
    wherein part of the feed mechanism is covered by both of the first front cover and the second front cover when at least part of the first front cover is on the rear side of the second front cover.

2. The machine tool of claim 1 further comprising a supporting bed on which a guide bush is detachably mounted, the guide bush supporting the workpiece in a slidable manner on the front side of the main spindle,
    wherein at least one of the first front cover and the second front cover is removably mounted, and
    wherein at least one of the removed first front cover and the removed second front cover is attached as a common cover to such a position as covering part of the feed mechanism including the rear end thereof.

3. The machine tool of claim 2 further comprising a rear cover mounted on the headstock to protect part of the feed mechanism on the rear side of the first front cover mounted on the headstock,
    wherein the driving unit is further provided with a rear end supporter which rotatably supports a rear end of the feed mechanism,
    wherein the common cover is removably attached to the rear end supporter between the main spindle and the feed mechanism in a different position from the rear cover with respect to the diameter direction, and
    wherein part of the feed mechanism is covered by both of the rear cover on the front side and the common cover on the rear side.

4. The machine tool of claim 2, wherein the common cover is provided with a common engagement structure available wherever the common cover is mounted.

5. The machine tool of claim 3, wherein the common cover is provided with a common engagement structure available wherever the common cover is mounted.

* * * * *